United States Patent Office 3,522,740
Patented Aug. 4, 1970

3,522,740
LUBRICATION AND BEARING ARRANGEMENT FOR VIBRATION GENERATORS
James E. Hynes, Rockford, Ill., and Zbyslaw A. Tendorf, Buffalo, and Frank A. Scarcella, Kenmore, N.Y., assignors to Westinghouse Electric Corporation, Pittsburgh, Pa., a corporation of Pennsylvania
Filed Nov. 1, 1968, Ser. No. 772,759
Int. Cl. F16h 33/14
U.S. Cl. 74—87  4 Claims

ABSTRACT OF THE DISCLOSURE

An oil lubricating arrangement for lubricating spherical roller bearings in a vibration generator regardless of the angular position of the generator, the arrangement comprising a tube supported in a heavy eccentric weight mounted for rotation by said bearings, said tube adapted to direct oil from a reservoir adjacent the weight to the bearings when the weight is rotated.

BACKGROUND OF THE INVENTION

The present invention relates to mechanical vibration generators or oscillators energized by a drive motor, and particularly to a bearing lubrication arrangement in the oscillator which allows oil lubrication of spherical roller bearings supporting a heavy rotating eccentric weight regardless of the angular position of the oscillator.

The efficient and effective handling and transfer of bulk material and fungible goods has become a primary concern in the industrial world. A large portion of bulk material is moved by a vibratory or oscillating motion which is produced generally by two types of drive action, namely, a positive drive cam action or by the rotation of a shaft carrying at least one eccentric weight structure, both types employing a motor for driving the cam or weight structure providing the action. Such means are usually termed vibration oscillators or generators.

The ideal vibration generator should meet the following requirements. First of all, the generator package must be small in size so that a minimum amount of valuable factory floor space is utilized. Secondly, the generator must produce the maximum unbalanced load at relatively high speeds. For high speed operation large spherical roller bearings must be oil lubricated. Thirdly, the generator must be capable of being mounted at any angle from a vertical to a horizontal position. This requirement is difficult to meet when oil lubricated bearings are used. And fourthly, the generator package should require a minimum amount of maintenance.

Presently, there are several means by which a drive motor and an eccentric weight are coupled together, said means including pulley and belt arrangements, direct mounting of the weight or weights on the shaft of the drive motor, direct attachment of the weight to an extension of the motor shaft, and the motor shaft eccentrically coupled directly to the weight in a manner to drive the weight eccentrically. With the last three coupling devices the motors are attached, with the eccentric weights, directly to the structure or equipment to be vibrated.

Insofar as meeting the above named and other requirements, a fifth type of prior art generator structure comes the closest. This type of structure includes a rigid housing enclosing the eccentric weight, shaft and bearings, the housing being further fixed to the vibratory equipment with the rotor of the drive motor being in concentric alignment with the shaft. An example of such a structure is disclosed in U.S. Pat. 2,972,688 issued to W. Mahlfeldt on Feb. 21, 1961.

In the Mahlfeldt patent, a rotor shaft of a vertically mounted motor is extended to form a shaft for supporting a heavy eccentric, vibration producing weight member. The shaft extension is supported by two spaced apart cylindrical roller bearing structures for handling radial or centrifugal load developed by the rotating member, and a third, ball bearing arrangement disposed to take thrust or axial load imposed by the weight of the rotating components including the heavy weight member.

The Mahlfeldt generator, while having certain advantages, has disadvantages which limit its use in the vibrating apparatus art. Specifically, the trend in the industry is towards a larger, more rugged and higher frequency vibratory apparatus and equipment. Such equipment requires generators which will provide the high speed, brute force necessary for producing large amplitude vibrations at the higher frequencies. As evidenced by the Mahlfeldt disclosure, the ball bearing arrangement must handle all of the thrust load since his cylindrical bearings can handle only radial load. Thus, from a reliability and maintenance standpoint, the single ball bearing thrust arrangement limits the use of the generator to smaller equipment requiring vibration magnitudes substantially less than that required for the larger, more rugged equipment.

Further, as mentioned earlier, maximum unbalanced loads at high speeds require spherical roller bearings, which the Mahlfeldt device does not have, and such loads and speeds further require oil lubrication of the bearings, an item on which the Mahlfeldt patent is silent. The Mahlfeldt generator, like other prior art structures, probably employs a type of oil lubricating system which limits the generator to vertical mounting and disposition only. Grease lubricating means might be employed, but such means are limited to low speed, small amplitude operations.

BRIEF SUMMARY OF THE INVENTION

Briefly, the present invention employs an open-ended tube fixed in an eccentric weight of a mechanical vibration generator, and two spherical roller bearing structures spaced apart with the weight disposed between them. The weight is fixed to and the bearings are located around a shaft extending through a housing secured to the frame of a drive motor, the rotor of which is in concentric alignment with the shaft and bearings, and fixed thereto to rotate the shaft and weight. The tube is bent in a manner to provide a bend or elbow portion adjacent one of the bearings, and to allow the tube to extend between the weight and a pool or reservoir of lubricating oil contained within the generator housing. The tube has an inlet end disposed to extend into the reservoir of oil, and a discharge end disposed to direct oil to one of the bearings. A small opening is provided in the bent or elbow portion of the tube adjacent the other of said bearings.

The tube functions to supply oil to the bearings in the following manner. With rotation of the eccentric weight, the end of the tube extending into the pool of oil travels through the oil at a certain velocity. By virtue of the "pitot tube effect" the oil enters the tube and is forced through to issue out at the opening provided in the elbow and out the discharge end of the tube to supply oil to the respective bearings. In this manner, the bearings can be lubricated at any angular position of the generator.

The two spherical roller bearings handle both radial and thrust loads thereby rendering unnecessary a third thrust bearing, and these loads can be of a much greater value than that handled by prior art devices such as the patented Mahlfeldt device.

THE DRAWINGS

The invention, along with its advantages and objectives, will be more apparent from the following detailed descrip-

3 tion taken in connection with the accompanying drawings in which:

PREFERRED EMBODIMENT

Figure 1:
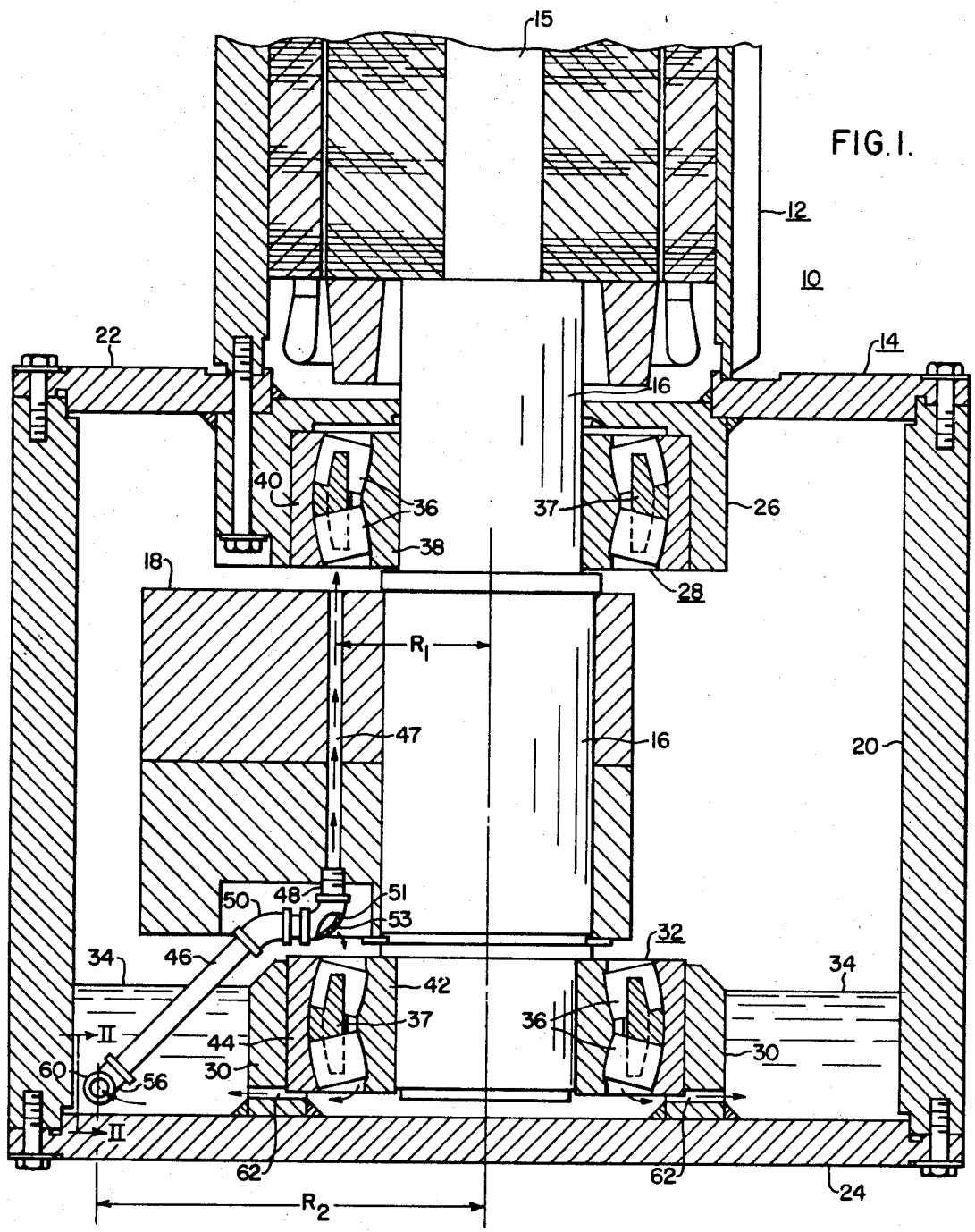
FIG. 1 is a vertical section of a vibrator provided with bearings and a lubricating system constructed in accordance with the principles of the invention.

Specifically, FIG. 1 shows a mechanical vibrator 10 comprising an electric motor 12 (only a portion of which is shown), one end of which is suitably attached to a housing structure and unit generally designated 14. The motor 12 has a rotor shaft 15 provided with an enlarged portion or shaft extension 16 extending into the housing, the shaft 16 supporting an eccentrically disposed weight member 18 suitably fixed to the shaft.

The housing 14, preferably cylindrical in shape, comprises a cylindrical wall 20, and top and bottom plates 22 and 24, respectively, suitably secured to the ends of the cylindrical wall, for example by bolts threaded therein as shown.

The upper end of the housing 14 includes further a reentrant portion or bushing 26 supporting a bearing structure 28 presently to be described. In a similar manner a second support bushing 30 is disposed on and fixed to the inside surface of the lower plate 24 for supporting a second similar bearing structure 32.

The housing 14 is suitably sealed to hold a reservoir of oil 34 for lubricating the bearings 28 and 32 in a novel manner to be described hereinafter.

The bearing structures 28 and 32 are capable of handling simultaneously both radial and thrust loads, the bearing structures being further capable of handling loads of a much greater value than prior art devices even when such devices employ a separate bearing for handling only thrust loads. This is accomplished in the present disclosure by the use of rugged spherical rollers 36 which support the shaft 16 and the eccentric weight 18 for high speed rotation and high amplitude vibrations. The rollers are supported in an annular cage 37 (shown in section) having pockets formed to fit the contour of the rollers.

The spherical rollers 36 and the cage 37 are held between inner and outer races located at each end of the weight 18. Thus, the bearing arrangement 28 comprises an inner race 38 engaging the shaft 16 and an outer race 40 disposed in the reentrant support bushing 26 with the spherical rollers secured between the races.

In a similar manner, at the lower end of the shaft 16, the bearing arrangement 32 includes an inner race 42 engaging the shaft, and an outer race 44 disposed in the lower support bushing 30, the spherical rollers 36 being secured between the races.

The inner races 38 and 42 engage the shaft 16 in a sliding fit manner which allows axial movement of the shaft with changes in environmental temperature. The outer races however are supported in the housing portions 26 and 30 in an interference fit manner which fixes the bearing arrangements 28 and 32 in their respective locations along the axis of the shaft.

In accordance with the invention, the bearings 28 and 32 are positively and effectively lubricated in any angular position of the vribrator 10. This is accomplished by use of a self-contained lubricating system which includes the oil reservoir 34 provided within the sealed housing unit 14. The system includes further a relatively small tubular element or conduit 46 having one end secured in the eccentric weight 18, and the other end extending into the reservoir 34 and beyond the peripheral extremity of the weight as best seen in FIG. 1. As shown, the

4 weight is provided wtih a relatively small tubular channel 47 extending the axial length of the weight with the tube 46 being threaded into the weight, via nipple 48, in fluid communication with said channel. The channel 47, however, may be formed to accommodate the tube throughout the length of the channel, in which case the nipple 48 would not be necessary.

As seen in FIG. 1, the tube 46 extends between the outer corner of the reservoir 34 and an inner portion of the ecentric weight 18 adjacent the shaft 16. As further seen, a portion of the tube is disposed near the lower support bushing 30 and bearing 32. To avoid contact with the bushing and bearing, two elbows are employed to provide the necessary bends or configuration to connect the tube to the nipple 48. Other means, however, may be used to provide the tube with the proper bends. For example, the tube may be originally formed with the configuration provided by the elbows of FIG. 1, or it may be bent to form the proper configuration, in which cases, the elbows would not be necessary.

A small opening 53 is provided in the wall of the elbow 51 at a location immediately over the bearing 32 and rollers 36 as seen in the broken away portion of the elbow in FIG. 1.

Figure 2:
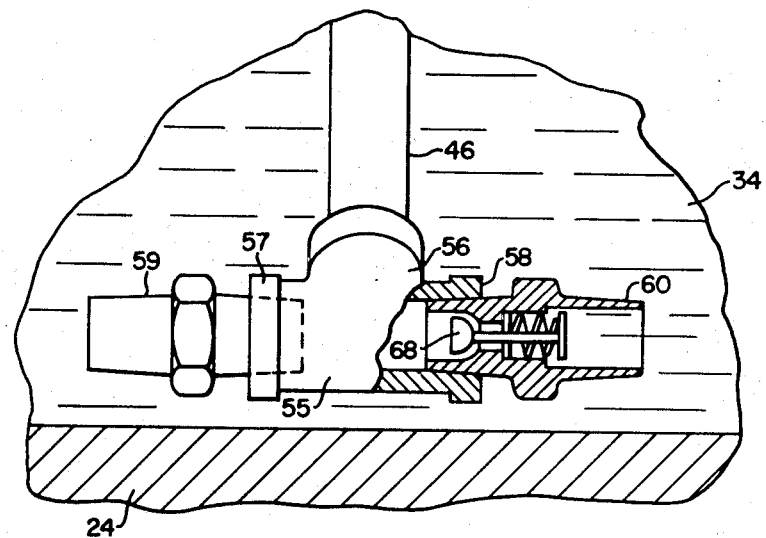
FIG. 2 is an elevation view (and partial section) of the oil inlet portion of the lubricating system shown in FIG. 1.

As best seen in FIG. 2, the end of tube 46 extending into the reservoir 34 is provided with an open ended T connection 55 having an intermediate end portion 56 suitably secured to the tube end. The T connection has opposed end portions 57 and 58 provided with check valves 59 and 60. The T and check valves provide a means for lubricating the bearings 28 and 32 in either direction of shaft rotation in a manner presently to be explained.

The novel lubricating system, as thus far described, functions in the folowing manner. When the motor 12 is energized, its shaft 15 and shaft 16 rotate to rotate the eccentric weight 18 attached thereto. As the eccentric weight rotates, the tube 46 rotates therewith so that the portion of tube extending into the reservoir 34 moves through the oil. The oil enters the inlet end of the tube through one of the check valves 59 or 60 and is forced up through the tube and the channel 47 in the weight. The oil discharges through the opening 53 in the elbow 51, and through the end of the channel adjacent the upper bearing 28 to lubricate respectively the bearings 32 and 28. The oil leaves the upper end of the channel 47 with a force sufficient to penetrate the bearing 28 about the rollers 36, and, with the vibrator 10 in a vertical position, the oil returns through the bearing to fall to the reservoir 34 by the force of gravity.

With the lower bearing 32, the oil travels through the bearing and about the rollers 36, and is returned to the reservoir through openings 62 provided in the lower part of the support bushing 30 as indicated by appropriate arrows.

Figure 3:
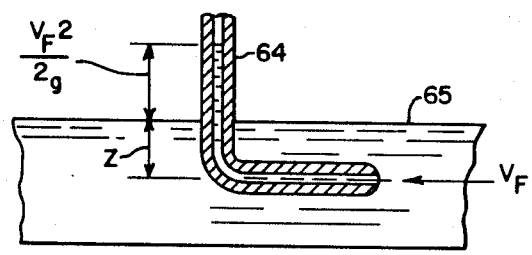
FIG. 3 is a diagrammatic presentation with mathematical designations helpful in explaining the invention.

The basic principle on which the lubricating system of the invention is based is termed generally the "pitot tube effect." When a pitot tube, such as shown in FIG. 3 is disposed into a fluid moving at velocity $V_F$, the fluid rises in the tube a distance of $V_F^2/2_g$ above the level of the fluid, $g$ being the gravitational constant of 386 inches per second squared. Conversely, if the pitot tube is moved through a fluid at a velocity $V_F$, the fluid will rise in the tube a distance of $V_F^2/2_g$.

In FIG. 3, a pitot tube 64 is bent to form an L-shaped structure with the lower end disposed in a liquid 65 to represent schematically the tube structure 46 and 47 employed in the lubricating system of the present invention as thus far described. As the tube is moved through the liquid, a head $D_H$ develops which is the difference between a velocity head $V_H$ and a centrifugal head $C_H$. The velocity head in inches is $$V_H = \frac{(V_T)^2}{2_g} = (R_2\omega)^2$$

where:

$V_T$ and $R_{2\omega}$ is the velocity of the tube inlet in inches per sec.;

$R_2$ is the radius from the shaft 16 centerline to the tube inlet opening in inches as indicated in FIG. 1;

$\omega$ is $2\pi f$;

$f$ is the rotational speed of the shaft 16 in revolutions per second;

$g$ is 386 inches per second square.

The centrifugal head in inches is $$C_H = \frac{(R_{2\omega})^2}{2g} - \frac{(R_{1\omega})^2}{2g}$$

when $R_1$ is the radius from the centerline of the shaft 16 to the vertically disposed tube or channel 47 in the weight 18 as indicated in FIG. 1.

As mentioned above, the developed head is equal to the difference between the velocity head $V_H$ and the centrifugal head $C_H$, the velocity head trying to push the liquid or oil up the tubes 46 and 47 (or 65 in FIG. 3), and the centrifugal head trying to centrifugally force the oil out of the tube. Thus, in inches $$D_H = V_H - C_H$$
$$= \frac{(R_{2\omega})^2}{2g} - \frac{(R_{2\omega})^2}{2g} + \frac{(R_{1\omega})^2}{2g}$$
$$= \frac{(R_{1\omega})^2}{2g}$$

Without considering the losses in the lubricating system, if the radius $R_1$ in FIG. 1 is four inches, for example, the developed head at 900 r.p.m. of the weight 18 is $$D_H = \frac{(4 \times 2\pi f)^2}{2g} = \frac{(4 \times 2\pi \times 15)^2}{2 \times 286} = 183 \text{ inches}$$

As the tube 46 rotates, the T connection 56 and check valves 59 and 60, attached to the inlet end of the tube, travel through the oil in reservoir 34 in one of two possible directions. The check valves are constructed with a closure member 68 (FIG. 2) suitably designed to open and close under fluid pressure, the opening and closing functions depending upon the direction of said pressure. Thus, the check valve moving into or against the flow of oil in 34 opens under the force thereof while the oppositely disposed check valve is maintained in a closed position by virtue of liquid pressure in the rear of the closure member. In this manner, the oil flow system of the invention permits effective lubrication of the bearings 28 and 32 in both possible directions of rotation of the weight without the oil discharging from the inlet end before it reaches the upper bearing 28.

Figure 4:
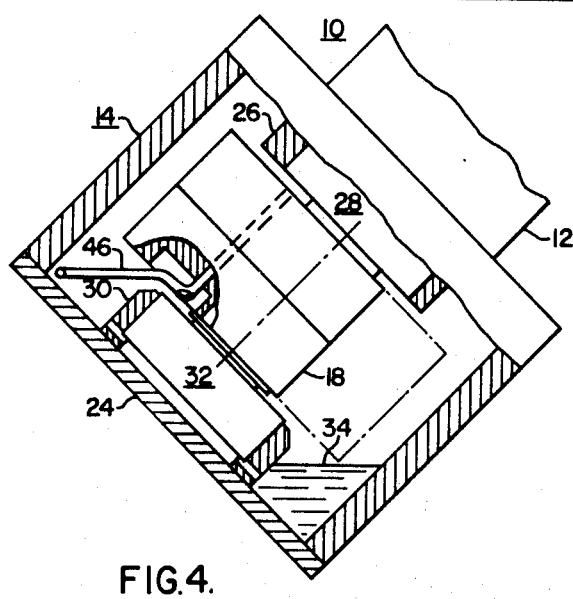
FIGS. 4 and 5 show two positions in which the vibrator of FIG. 1 can function.
Figure 5:
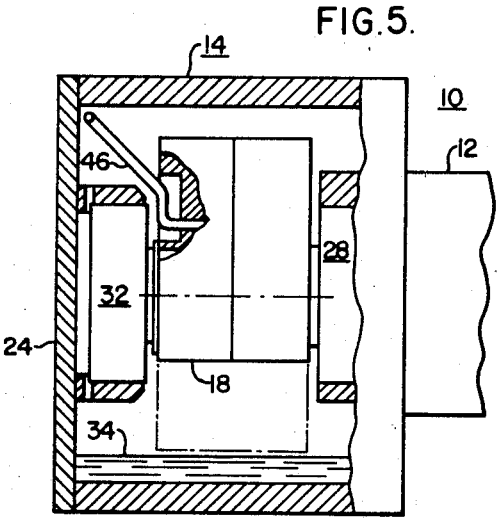

The invention, with the check valves, further allows effective bearing lubrication in any angular position of the vibrator 10 between vertical and horizontal positions, as indicated in FIGS. 4 and 5, and in such a manner that the eccentric weight 18, when rotating, does not contact or pass through the oil in 34 to cause foaming of the oil. With the vibrator tilted or in a horizontal position, the inlet end of the tube 46 passes into and out of oil as it travels about the lower support bushing 30. Again the check valves 59 and 60 permit the oil to enter the tube inlet end while preventing the oil from leaving the inlet end.

As seen in FIGS. 4 and 5, the level of the oil is such that the inlet end of the tube 46 easily engages the oil in the reservoir 34 while the eccentric weight 18 rotates above the level of oil. For this reason, the only element that can cause foaming of the oil is the tube 46 and the inlet end components, all of which are relatively small and may be streamlined to further minimize foaming.

It should now be apparent from the foregoing description that a new, useful and unobvious vibrator or vibration generator has been disclosed, said generator employing spherical roller bearings in a radial and thrust load manner, and a simple, yet effective system for oil lubricating said bearings in any angular position of the generator.

Though the invention has been described with a certain degree of particularity, changes may be made therein without departing from the spirit and scope thereof.

What is claimed is:

1. A bearing and lubrication arrangement for a mechanical vibrator comprising
    a housing structure,
    a reservoir of oil contained within said housing,
    a shaft extending into said housing,
    a weight structure eccentrically attached to said shaft for rotation within said housing,
    bearing structures located at each end of said weight and disposed about said shaft for handling both radial and thrust loads,
    a tube secured in said weight for rotation therewith, said tube extending axially and radially beyond the weight so that one end of the tube moves through the oil in said reservoir when the shaft rotates, the other end of the tube being secured in a passage in the weight to direct oil therethrough to one of said bearings, the tube also having an opening adjacent the other of said bearings to supply oil thereto, and said first mentioned end of said tube having an angular inlet portion such that movement of the tube through the oil causes oil to flow therethrough.

2. The arrangement described in claim 1 in which the bearing structures include spherical rollers supported between inner and outer races.

3. The arrangement described in claim 2 in which the inner races engage the shaft in a sliding fit manner while the outer races are fixed in annular support structures attached to the housing.

4. The arrangement described in claim 1 in which said angular portion of the tube includes a T connection having opposed open-ended end portions and an intermediate end portion, said intermediate end being connected to the tube, and
    a check valve respectively connected to each of said opposed end portions.

References Cited

UNITED STATES PATENTS

| | | | |
|---|---|---|---|
| 787,654 | 4/1905 | Allmond | 184—63 X |
| 3,344,293 | 9/1967 | Wahl | 310—81 |

MILTON KAUFMAN, Primary Examiner

U.S. Cl. X.R.

184—63; 310—81